United States Patent
Dyke et al.

(10) Patent No.: US 8,526,435 B2
(45) Date of Patent: Sep. 3, 2013

(54) PACKET NODE FOR APPLYING SERVICE PATH ROUTING AT THE MAC LAYER

(75) Inventors: Eric Dyke, Verdun (CA); Benoit Tremblay, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 538 days.

(21) Appl. No.: 12/727,385

(22) Filed: Mar. 19, 2010

(65) Prior Publication Data

US 2011/0228778 A1     Sep. 22, 2011

(51) Int. Cl.
*H04L 12/28*  (2006.01)
*H04L 12/56*  (2011.01)

(52) U.S. Cl.
CPC .................... *H04L 45/00* (2013.01)
USPC ........ 370/392; 370/351; 370/389; 370/398; 370/399; 370/409

(58) Field of Classification Search
None
See application file for complete search history.

(56) References Cited

U.S. PATENT DOCUMENTS

| | | | |
|---|---|---|---|
| 6,408,182 B1 * | 6/2002 | Davidson et al. .............. 455/433 |
| 6,971,044 B2 | 11/2005 | Geng et al. | |
| 7,411,945 B2 | 8/2008 | Monette et al. | |
| 7,411,953 B2 | 8/2008 | Monette et al. | |
| 7,417,987 B2 | 8/2008 | Shenoy et al. | |
| 7,480,303 B1 | 1/2009 | Ngai | |
| 7,779,086 B1 * | 8/2010 | Gammo et al. ................. 709/219 |
| 7,801,150 B1 * | 9/2010 | Rupavatharam ......... 370/395.32 |
| 7,881,208 B1 * | 2/2011 | Nosella et al. ................. 370/242 |
| 2003/0043825 A1 * | 3/2003 | Magnussen et al. .......... 370/401 |
| 2004/0215752 A1 * | 10/2004 | Satapati et al. ................ 709/223 |
| 2005/0025179 A1 * | 2/2005 | McLaggan et al. ........... 370/468 |
| 2006/0045089 A1 * | 3/2006 | Bacher et al. .................. 370/392 |
| 2006/0140194 A1 | 6/2006 | Monette et al. | |
| 2007/0002833 A1 * | 1/2007 | Bajic .............................. 370/352 |
| 2007/0288653 A1 * | 12/2007 | Sargor et al. .................. 709/245 |
| 2008/0181243 A1 * | 7/2008 | Vobbilisetty et al. ......... 370/406 |
| 2008/0186965 A1 * | 8/2008 | Zheng et al. ................... 370/389 |
| 2009/0304002 A1 | 12/2009 | Yu et al. | |
| 2009/0323631 A1 * | 12/2009 | Bajic .............................. 370/331 |
| 2010/0054260 A1 * | 3/2010 | Pandey et al. ............. 370/395.53 |
| 2010/0265824 A1 * | 10/2010 | Chao et al. ..................... 370/235 |
| 2010/0306571 A1 * | 12/2010 | Rupavatharam ................... 714/3 |
| 2010/0325257 A1 * | 12/2010 | Goel et al. ..................... 709/223 |
| 2011/0035494 A1 * | 2/2011 | Pandey et al. ................. 709/224 |
| 2011/0103389 A1 * | 5/2011 | Kidambi et al. ........... 370/395.1 |
| 2011/0191506 A1 * | 8/2011 | Srinivasan ....................... 710/22 |

FOREIGN PATENT DOCUMENTS

GB            2 458 154 A        9/2009

* cited by examiner

*Primary Examiner* — Ayaz Sheikh
*Assistant Examiner* — Peter Chau

(57) ABSTRACT

A packet node and corresponding methods are provided for providing services to packets received at the packet node. At an ingress card, a packet is classified and a virtual media access control (VMAC) address is attached to the packet. The VMAC address identifies a service component for providing a service to the packet. Layer two switching of the packet is made within the packet node, based on the VMAC address. After processing of the packet by the service component, a new VMAC address is attached to the packet. Further layer two switching of the packet, based on the new VMAC address, may lead to further processing by another service component or to forwarding of the packet beyond the packet node.

13 Claims, 4 Drawing Sheets

PACKET NODE FOR APPLYING SERVICE PATH ROUTING AT THE MAC LAYER

TECHNICAL FIELD

The present invention relates generally to the field of communications and, more specifically, to a packet node for applying service path routing at the media access control (MAC) layer.

BACKGROUND

Recently, a concept of Service Path Routing (SPR) has been introduced in internet protocol (IP) nodes. According to SPR, packets traversing an IP node are routed through a pre-defined set of hardware cards, also called blades. Each packet entering the IP node is classified and assigned to a service path defining which blades of the IP node are to be visited by the packet and treated thereat.

Solutions based on SPR propose a special forwarding engine (FE) to classify packets and add a special indication to a packet, to determine a service to which this packet belongs. The FE needs to be invoked after each service blade has performed its task in order to determine if another service blade needs to further process the packet. Hence, the FE is generally present on each service blade, or shared by several service blades.

Current solutions require FEs at multiple components (e.g. several cards or blades) of an IP node. Because FEs are complex and expensive, this requirement has so far prevented a wide adoption of the SPR concept. In addition, while an instance of the FE may in principle be shared by multiple blades, presence of an FE instance on every service blade is required for maximum performance. This latter requirement may only come at the expense of increased costs of the service blades.

SUMMARY

It is therefore a broad object of this invention to provide a node that reuses Ethernet switching capabilities.

A first aspect of the present invention is directed to a packet node. The packet node comprises several cards. A first card acts as an ingress card for receiving a packet on an input port. The ingress card classifies the packet according to a service provided by the packet node. The ingress card then adds to the packet a first virtual media access control (VMAC) address selected according to the service. The ingress card then forwards the packet to a layer two switch. The layer two switch receives the packet and forwards it to a first service component based on the first VMAC address. The first service component receives and processes the packet. It replaces the first VMAC address of the packet with a second VMAC address and forwards the packet to the layer two switch. The layer two switch receives again the packet and, based on the second VMAC address, forwards the packet to a second service component or to an egress card. The egress card receives the packet, removes the second VMAC address, and forwards the packet on an output port of the egress card.

A second aspect of the present invention is directed to an embodiment of the packet node that further comprises a controller. The controller receives, upon startup of the packet node, registrations from a plurality of service components. Each of the registrations is for a distinct service provided by the packet node. The controller assigns a corresponding VMAC address to each service. A plurality of VMAC addresses is thereby mapped on the plurality of service components. The controller stores mappings between the plurality of VMAC addresses and the plurality of service components in a table of the layer two switch.

A third aspect of the present invention is directed to a method of switching a packet in a packet node. The method comprises a first step of receiving the packet at a layer two switch of the packet node, from an ingress card of the packet node. The packet comprises a first VMAC address selected according to a service provided by the packet node. The layer two switch forwards the packet to a first service component of the packet node, the first service component being selected by the layer two switch based on the first VMAC address. The layer two switch receives again the packet from the first service component, the packet now comprising a second VMAC address. On the basis of the second VMAC address, the layer two switch forwards the packet either to a second service component of the packet node or to an egress card of the packet node.

A fourth aspect of the present invention is directed to a method of configuring a packet node. A controller of the packet node receives registrations from a plurality of service components of the packet node. The registrations are for each of a plurality of services provided by the packet node. The controller assigns a corresponding VMAC address to each of the plurality of services, a plurality of VMAC addresses being mapped on the plurality of service components. Mappings between the plurality of VMAC addresses and the plurality of service components are stored in a layer two switch of the packet node. The VMAC addresses are for switching, by the layer two switch, packets received at the packet node, switching being made on the basis of services provided to the packets by the packet node.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

Figure 1:
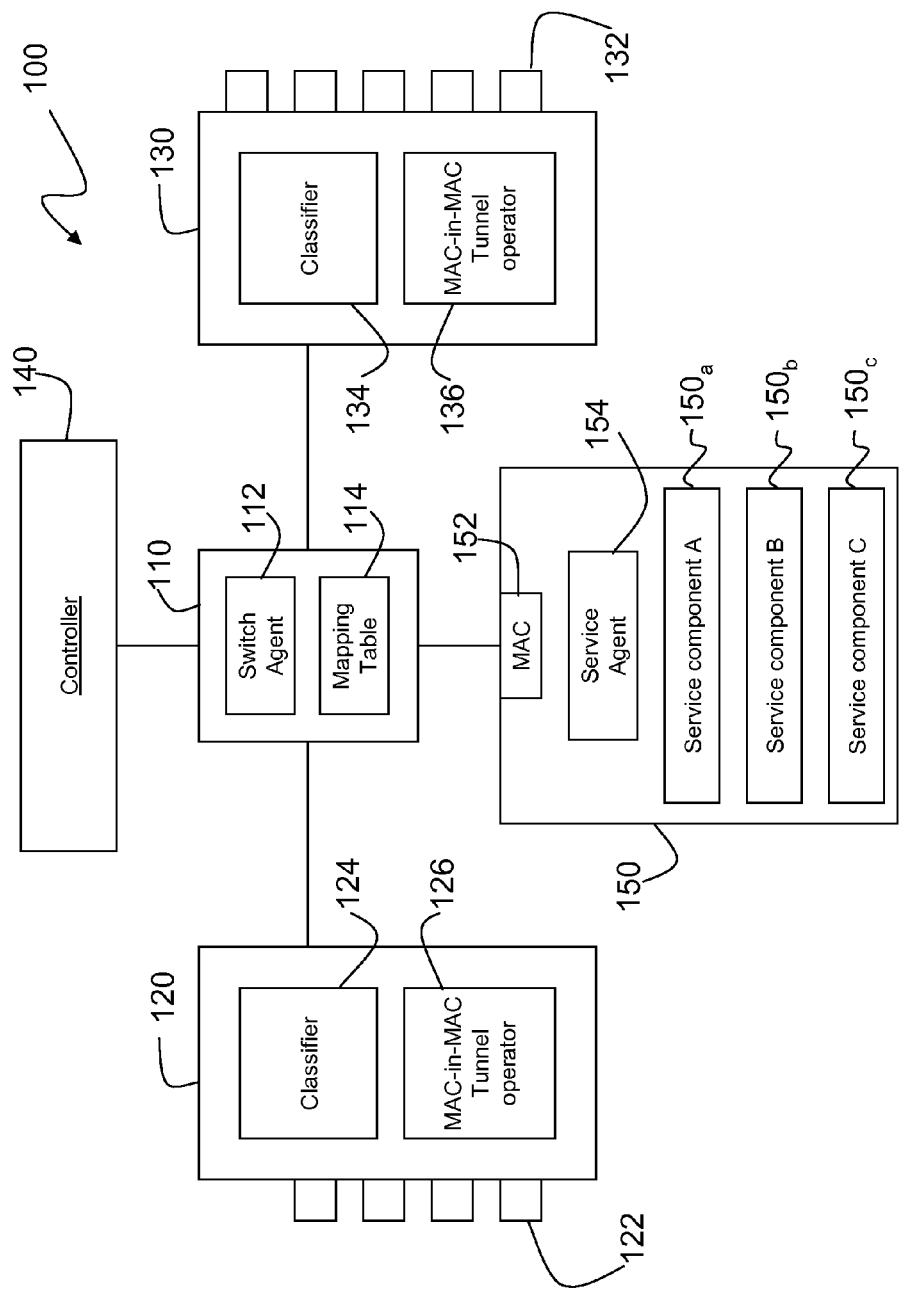
FIG. 1 shows a functional diagram of an exemplary packet node, as per some teachings of the present invention.

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a node for treating data packets. A data packet arrives at the node and is classified by an ingress card. The principles underlying the packet classification are essentially conventional; however a result of this classification is not conventional. Building on the presence of an Ethernet-capable switch in a backplane of current packet nodes, the present invention assigns a virtual media access control (VMAC) address to the packet, as a result of the packet classification. The VMAC address thus acts as a service identifier for a service applied to the packet by the packet node. While the VMAC address has a generic MAC address format and can thus be handled by a conventional Ethernet layer two switch, the VMAC does not relate to any physical port. The VMAC address is used solely within the packet node and thus does not require to be coordinated with MAC addresses used any other network element in communication with the packet node. The packet, enhanced by the addition of the VMAC address, is directed to a service component by the layer two switch. The service component applies a treatment to the packet, overwrites the VMAC address with a new VMAC address indicative of a result of the treatment, and returns the packet to the layer two switch. Based on the new VMAC address, the layer two switch may forward the packet to another service component that performs similar actions. Eventually, based on a final VMAC address inserted in the packet by a last service component, the layer two switch forwards the packet to an egress card that removes the VMAC address and forwards the packet to an intended destination, beyond the packet node. It may be observed that while the layer two switch directs the packet based on VMAC addresses that reflect services provided by the packet node, the layer two switch is in fact unaware of any notion of those services. The use of virtual addresses provide the possibility of hosting more than one service on a given service component card and the possibility to relocate a given service from one service component card to another, for example upon component failure.

In the context of the present invention, a packet node may comprise a router, a gateway, a server, and the like. The packet node may receive and route packets according to various protocols including the internet protocol (IP), the multiprotocol label switching (MPLS), Ethernet, and the like. Non-limiting examples of services that various embodiments of the packet node may provide include deep packet inspection, charging, filtering, audio transcoding, video transcoding, encryption, decryption, tunneling, detunneling, proxying, load distribution, lawful interception, and the like.

Reference is now made to the Drawings, in which FIG. 1 shows a functional diagram of an exemplary packet node, as per some teachings of the present invention. The packet node 100 as shown comprises a layer two switch 110, an ingress card 120, an egress card 130, a controller 140 and a service component card 150.

The controller 140 may be any commercially available, general purpose processor, or may be specifically designed for operation in the packet node 100. The controller 140 may be operable to execute processes related to the present invention in addition to numerous other processes.

Each of the ingress card 120 and the egress card 130 may support various types of interface and protocols. The packet node 100 may be connected toward a plurality of routers, gateways, servers and clients; means for connecting the packet node 100 toward other network elements may vary as, for example, connection toward one client might be on an Ethernet link while connection toward a gateway might be on an asynchronous transfer mode (ATM) link. Therefore each of the cards 120 and 130 may comprise a plurality of devices for connecting on a plurality of links of different types. Generic cards 120 and 130 are illustrated for ease of presentation of the present invention. Communication between the packet node 100 and other network elements, such as routers, may be bidirectional. As such, in some embodiments, some interface cards of the packet node 100 may at once act as ingress cards and as egress cards. For example, the ingress card 120 may receive a first packet from a first router, the first packet being later forwarded to a second router via the egress card 130. A second packet may arrive at the packet node 100, being sent from the second router, arriving at card 130 (now acting as an ingress card for the second packet), the second packet eventually being forwarded to the first router via card 120 (now acting as an egress card for the second packet). In some cases, a packet may be received at one of the cards 120 or 130 and, after processing, may be forwarded beyond the packet node 100 via the same card. Those skilled in the art will appreciate that the present description of FIG. 1 makes mentions of the ingress card 120 and of the egress card 130 as distinct entities for the purposes of illustrating some of the features of the present invention, without limiting its scope.

In some embodiments, some of the components 110-150 of the packet node 100 may be duplicated. For example, the packet node 100 may comprise several distinct service component cards, or a few separate layer two switches. A given service component card may comprise several service components while another service component card may hold a single other service component. In yet some other embodiments, one or more service components may be implemented on ingress cards or on egress cards, or both. A given ingress card 120 or a given egress card 130 may also double as a service component card 150. As such, while the present description illustrates service component cards, ingress cards and egress cards as distinct cards, this separation of features on distinct cards is made in order to clearly distinguish the various features of the packet node 100. It should be understood that variations in the hardware configuration of the packet node 100 may exist while still falling within the scope of the present invention as claimed. Elements of the packet node 100 are shown as directly coupled in FIG. 1. In a practical embodiment, communication between the various components of the packet node 100 may take the form of, for example, electrical or optical signals. The simplified coupling is shown in order to more clearly illustrate communication paths.

The ingress card 120 comprises one or more input ports 122, a classifier 124 and a MAC-in-MAC tunnel operator 126. The egress card 130 may comprise similar elements, including output ports 132, a classifier 134 and a MAC-in-MAC tunnel operator 136. The layer two switch 110 comprises a switch agent 112, and a mapping table 114. The service component card 150 comprises one or more service components $150_{a-c}$. A number of service components on a given service component card 150 may depend on various factors, including for example an amount of processing required in a given service component to fulfill its tasks or an expected amount of packet traffic arriving at the packet node requiring a given type of service. The service component card also comprises a service agent 154. The service component card 150 is physically addressable via a MAC address 152. The MAC address 152 is for use by the service component card 150 for communicating within the packet node 100, and specifically with the controller 140, at the time of a registration process of the services, said process being described hereinbelow.

Configuration of the packet node 100 is made, for example, at system start or restart of the packet node 100. The controller 140 receives registrations from each of the service components $150_{a-c}$, the registrations being initiated at the service component cards 150 by the service agent 154. A registration may also be received at the controller 140 because a new service is introduced in one of the service components $150_{a-c}$, or moved between service component cards 150. Deregistration, or an equivalent process, may be used when a service is removed from a service component card 150. If there are more than one layer two switches 110, they may also send registrations to the controller 140. The controller 140 assigns a VMAC address to each one of the service components 150$_{a-c}$. Because these are virtual addresses, they do not relate to any physical port or entity of the packet node 100. However, because these addresses have the well-known format of MAC addresses, they can be used for switching by the layer two switch (or switches) 110. The controller 140 stores mappings of the VMAC addresses and of the service components 150$_{a-c}$ in the mapping table 114 of the layer two switch 110. The mappings may be realized as relations between the VMAC addresses and internal ports (not shown) of the layer two switch 110, the switch ports corresponding to connections on the service component card 150. The mappings may further comprise virtual local area network (VLAN) identifications. A given service component 150$_{a-c}$ may support more than one service, possibly in combination with other service components 150$_{a-c}$ and may thus be part of more than one VLAN. The controller also stores the mappings in the classifier 124 of the ingress card 120 (the mappings may also be stored in the egress card 130, which also has a classifier 134 because the egress card 130 may act as an ingress card for some traffic). In some embodiments, the classifier 124 only needs to store the mappings for specific service components 150$_{a-c}$ that may first treat a packet incoming at the packet node 100. In fact, while some of the service components 150$_{a-c}$ may be for use after some processing of the packet has already taken place in other service components 150$_{a-c}$, it is in practice simpler to store all mappings in the classifier 124 rather than to make a selection of the mappings. In embodiments having more than one layer two switch 110, because each layer two switch 110 has registered to the controller 140, the controller 140 stores the mappings in every mapping table 114. It is to be noted that while the mappings reflect services offered by the packet node, the mapping table simply contains, from a practical standpoint, mappings between internal ports on the layer two switch 110, the switch ports being connected to components of the packet node, and VMAC addresses. The layer two switch (or switches) 110 is in fact unaware of any notion of the services provided by the packet node. Finally, the controller 140 provides information about the VMAC addresses to the ingress card 120 and to the service agent 154. The ingress card 120 stores the VMAC information in the classifier 124 (the egress card 130 does not necessarily need the VMAC information, but may store it in its classifier 134, accounting for the fact that the egress card 130 may act as an ingress card for packets arriving one of its ports 132). While the packet node 100 may comprise a plurality of service component cards 150, the service agent 154 of each service component card 150 stores a complete list of VMAC addresses assigned to the service components 150$_{a-c}$ located on all service component cards 150.

In operation, the packet node 100 receives a packet at an input port 122 of the ingress card 120. The packet is classified by the classifier 124 according to well-known methods including, but not limited to, basing the classification on a port number of the input port 122, on a port number, protocol, source address or destination address present in a header of the packet, on a packet size, on matching of various patterns with the header or with a payload content of the packet, on an inter-arrival rate of the packet relative of a previous packet, and the like. Based on a result of the classification, the classifier 124 selects one of the stored VMAC addresses, thereby selecting one of the service components 150$_{a-c}$ for providing a service to the packet. The classifier 124 may also further assign a VLAN identification to the packet. It should be observed that while the classification and the selection of the VMAC address, possibly adding the VLAN identification, effectively leads to the selection of a given service component, the classifier 124 may remain unaware of any relation between the given service component on one hand, and the selected VMAC address and VLAN identification on the other hand. The classifier 124 only needs to be aware of a relationship between a result of the packet classification and the VMAC address and VLAN identification. The MAC-in-MAC tunnel operator 126 encapsulates the packet by adding the selected VMAC address and optional VLAN identification. The ingress card 120 then places the encapsulated packet on the layer two switch 110. The layer two switch 110, using the mappings between VMAC addresses, the optional VLAN identification and service components stored in the mapping table 114, redirects the encapsulated packet to the intended service component 150$_{a-c}$, for example service component B 150$_b$. The service component B 150$_b$ decapsulates the packet, processes the packet according to its content and according to features of the service component B 150$_b$, and determines whether the packet requires further processing within the packet node 100. If no more processing is required, the service component B 150$_b$ obtains from the service agent 154 a VMAC address indicative that the processing is complete. If further processing is required, based on a nature of that further processing, the service component B 150$_b$ obtains from the service agent 154 a VMAC address designating another service component for continued processing. It is to be noted that this last service component may reside on any service component card 150 of the packet node 100. In either case, the service component B 150$_b$ encapsulates the packet with the VMAC address obtained from the service agent 154. The service component B 150$_b$ places the encapsulated packet on the layer two switch 110. The layer two switch 110 redirects the packet using its currently assigned VMAC address. A VMAC address having been selected by the service component B 150$_b$ on the basis that no more processing is required makes the layer two switch 110 forward the packet to the egress card 130. One possible manner of ensuring selection of the egress card 130 at the end of processing is to simply consider outputting of the packet by the egress card 130 as another one of the services provided by the packet node 100. As such, the egress card 130 may register this "outputting service" to the controller 140, in the same manner as any of the service components 150$_{a-c}$. In the egress card 130, the MAC-in-MAC tunnel operator 136 decapsulates the packet by removing the VMAC address and the optional VLAN identification. The packet is forwarded to its intended destination, as is well-known in the art, via the output port 132. If the VMAC address selected by the service component B 150$_b$ suggests that more processing of the packet is required, the selected VMAC address makes the layer two switch 110 forward the packet to the designated service components.

From the above, those skilled in the art will recognize that, for some services, in some embodiments, a first and a second service components may each support a part of a given service provided by the packet node. A final VMAC address designating the egress card is determined by a last one of the service components supporting the service provided by the packet node, when it has done its own processing of the packet. Of course, a second VMAC address determined by a first service component designates the egress card when the first service component completely supports a particular service provided to a given packet by the packet node. The first, second and any other VMAC addresses are part of a service path that the packet follows throughout the packet node.

Assigning a same VMAC address to more than one service results in bicasting or multicasting of the packet to more than one service components. This may be useful for some special services such as charging, lawful intercept or transcoding. For some services, in some embodiments of the packet node 100, a received packet is not forwarded beyond the packet node 100. A last service component treating the received packet does not return it to the layer two switch 110 at the end of processing. This may be the case, for example, for some charging or logging services. This may of course be the case when it is found that the packet is malevolent and comprises a virus, spam, or similar content.

A failure of one of the plurality of service components may be detected, for example by an alternate service component or by the controller 140. As this happens, the alternate service component may take over from the failed service component and provide the same or similar features and processing. The alternate service component sends an updated registration to the controller 140, which in turns updates a VMAC address mapping for a service now supported by the alternate service component. The same VMAC address initially allocated to the failed service component may be mapped to the alternate service component. The controller 140 stores the updated mapping on the mapping table 114 of the layer two switch 110. Consequently, as a new packet arrives at the ingress card 120, if the ingress card 120 selects the VMAC address designating the failed service component, the layer two switch 110 is capable of directing the packet to the alternate service component, using the updated mapping.

Figure 2:
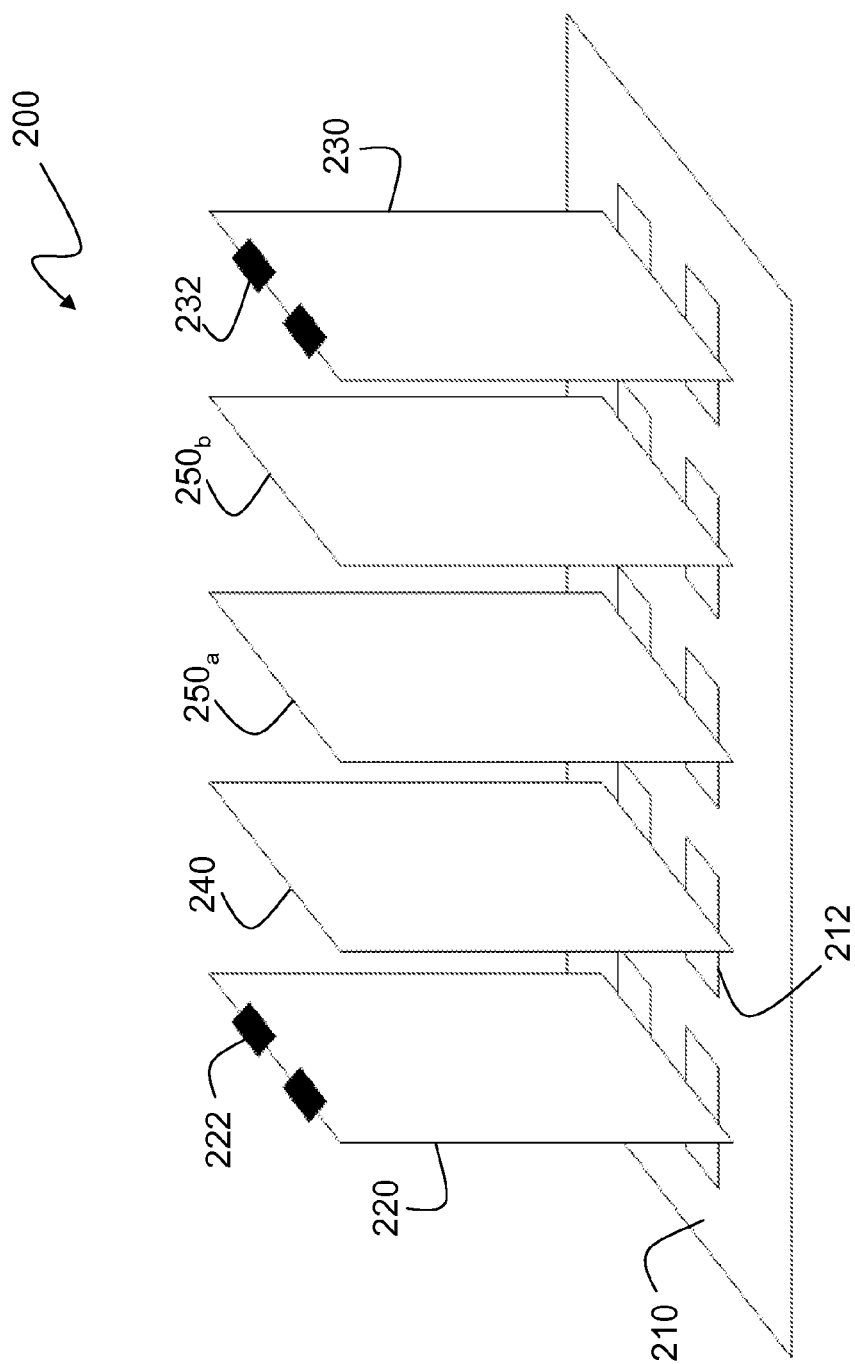
FIG. 2 shows a physical layout of an exemplary packet node, as per some teachings of the present invention.

FIG. 2 shows a physical layout of an exemplary packet node, as per some teachings of the present invention. A packet node 200 comprises a backplane 210, and several cards, also called blades. These include an ingress card 220, an egress card 230, a controller card 240, and one or more service component cards $250_{a\text{-}b}$. The packet node 200 may comprise other elements (not shown), as is well known in the art. A layer two switch is present, but not explicitly shown, because it is integral to the backplane 210. The cards 220-250 are connected to the backplane 210 by use of connectors 212 of the backplane 210. The connectors 212 may support any type of connection, including for example electrical or optical connections. The ingress card 220 comprises one or more input ports 222 and the egress card 230 comprises one or more output ports 232. As in the case of the ingress and egress cards of FIG. 1, the ingress card 220 and the egress card 230 may, in some embodiments, share similar features and functionalities and thereby interchangeably act as input for some traffic and output for some other traffic. The input ports 2220 and output ports 232 may support various types of physical interfaces as well as various protocols.

The packet node 200, as shown in FIG. 2 in its physical layout, embodies some or all of the features of the packet node 100 presented in relation with the description of FIG. 1. Service components are implemented on the one or more service component cards $250_{a\text{-}b}$, each of the service component card $250_{a\text{-}b}$ supporting one or more service components. In some embodiments, the controller and a given service component may be located on a same card.

Figure 3:
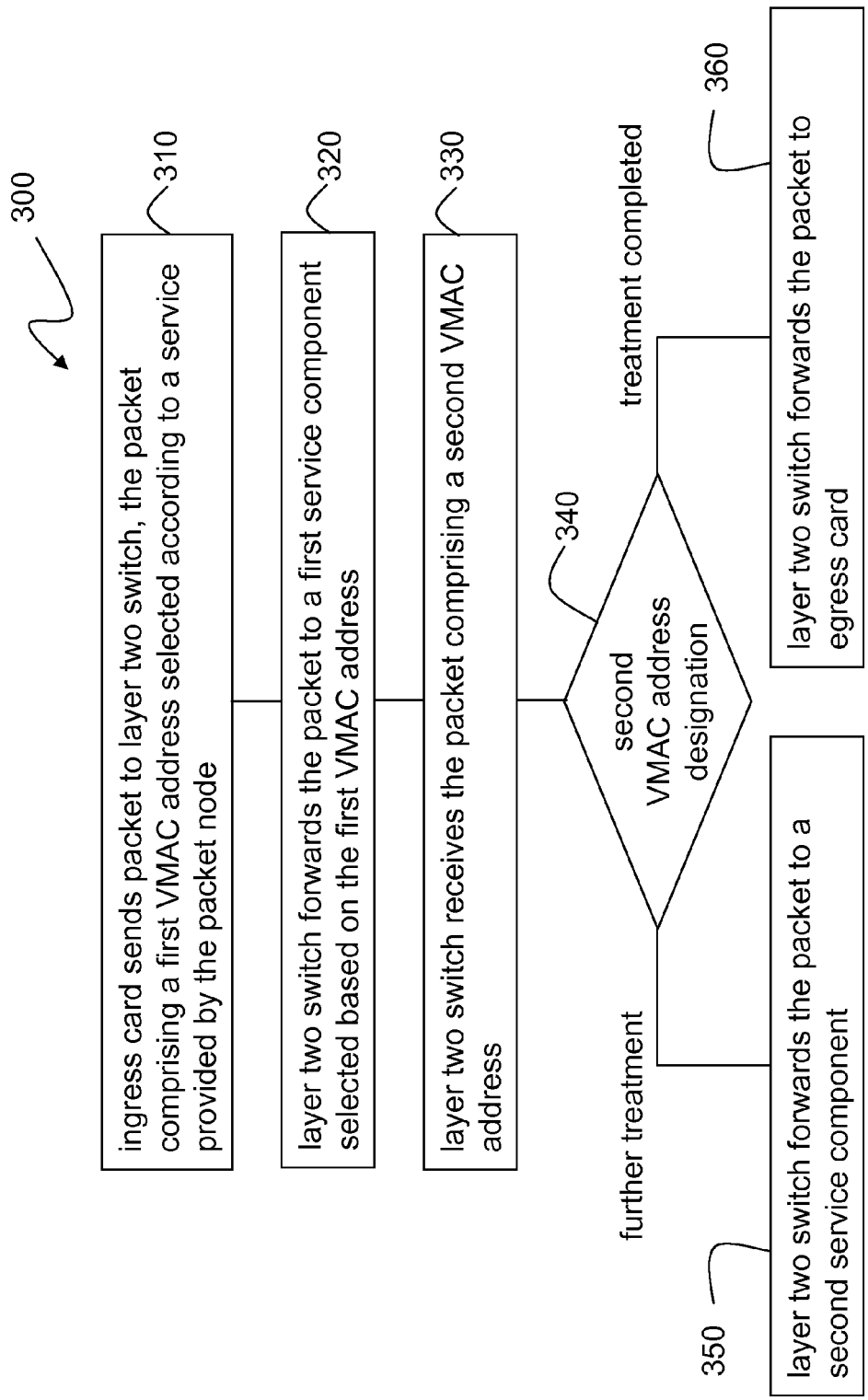
FIG. 3 shows a flow chart depicting exemplary steps of a switching method of the present invention.

FIG. 3 shows a flow chart depicting exemplary steps of a switching method of the present invention. A sequence 300 starts at step 310 when a packet is received at a layer two switch of a packet node, from an ingress card of the packet node. The packet comprises a first VMAC address selected according to a service provided by the packet node. The layer two switch forwards the packet, at step 320, to a first service component of the packet node. The first service component is selected by the layer two switch based on the first VMAC address. The selection by the layer two switch may rely on a mapping table of the layer two switch, wherein mappings of a list of VMAC addresses with a list of corresponding service components are stored. The layer two switch receives again the packet, at step 330, from the first service component. The packet now comprises a second VMAC address. The layer two switch considers the second VMAC address at step 340. If the VMAC address suggests that the packet requires further treatment, based on the mappings, the layer two switch forwards the packet to a second service component of the packet node at step 350. Otherwise, the treatment of the packet being completed, the layer two switch forwards the packet or to an egress card of the packet node at step 360.

Figure 4:
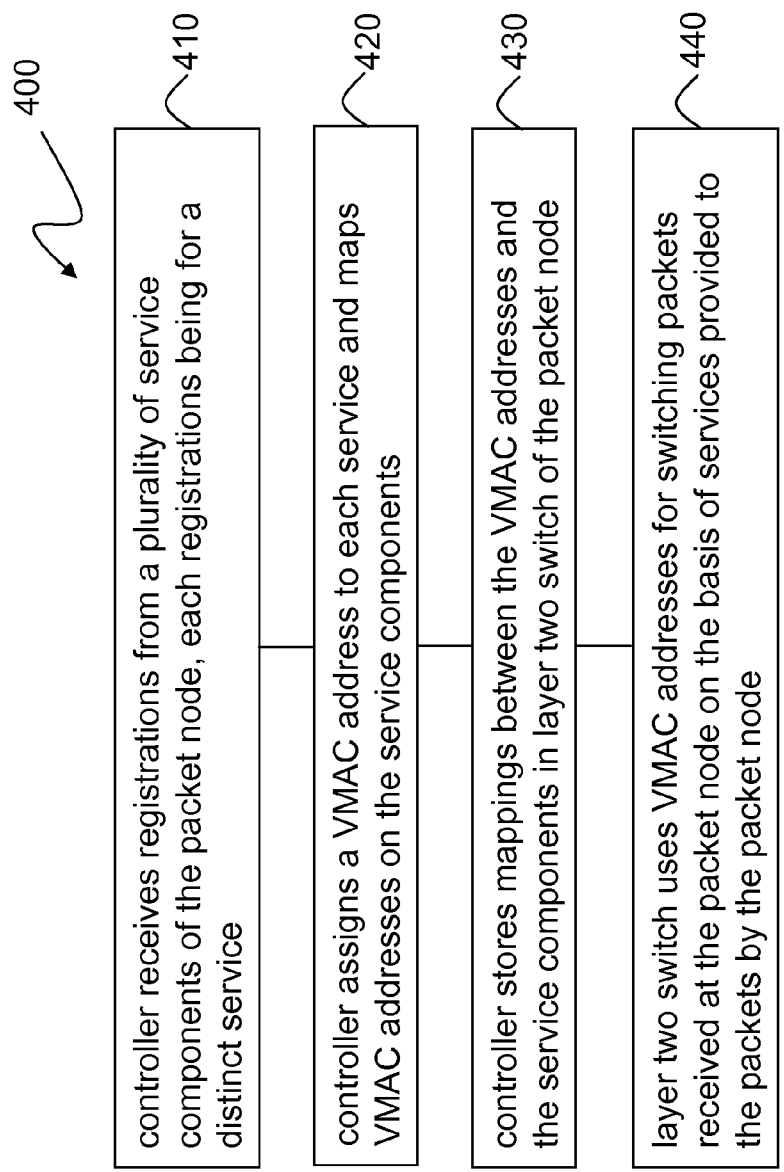
FIG. 4 shows a flow chart depicting exemplary steps of a configuration method of the present invention.

FIG. 4 shows a flow chart depicting exemplary steps of a configuration method of the present invention. A sequence 400 starts when a controller of a packet node receives registrations from a plurality of service components of the packet node. Each registration is for each of a plurality of services provided by the packet node. The controller assigns, at step 420, a corresponding VMAC address to each of the plurality of services. The controller maps each of a plurality of VMAC addresses to a corresponding one of the plurality of service components. The controller stores mappings between the plurality of VMAC addresses and the plurality of service components in a layer two switch of the packet node, at step 430. The layer two switch uses the VMAC addresses, at step 430, to switch packets received at the packet node on the basis of services provided to the packets by the packet node.

Although several aspects of the preferred embodiment of the methods and of the packet node of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A packet node, comprising:
    an ingress card for receiving a packet on an input port of the ingress card, for classifying the packet according to a service provided by the packet node, for adding to the packet a first Virtual Media Access Control (VMAC) address selected according to the service and for forwarding the packet;
    a layer two switch for receiving the packet from the ingress card and for forwarding the packet based on the first VMAC address;
    a first service component for receiving the packet from the layer two switch, for processing the packet, for replacing the first VMAC address of the packet with a second VMAC address, and for forwarding the packet to the layer two switch;
    a second service component for receiving the packet from the layer two switch based on the second VMAC address, for processing the packet, for replacing the second VMAC address of the packet with a third VMAC address and for forwarding the packet to the layer two switch;
    an egress card for receiving the packet from the layer two switch, for removing the third VMAC address, and for forwarding the packet on an output port of the egress card; and
    a controller for receiving registrations from a plurality of service components, upon startup of the packet node;
    wherein the first and second service components each support a part of the service provided by the packet node;

wherein the controller further provides the ingress card and each of the plurality of service components with a list of VMAC addresses;
wherein the ingress card selects the first VMAC address from the list of VMAC addresses after classifying the packet; and
wherein each of the plurality of service components uses the list of VMAC addresses to replace an incoming VMAC address before forwarding the packet.

2. The packet node of claim 1, wherein:
the first and second service components are implemented on one or more service component cards;
the layer two switch is located in a backplane of the packet node; and
the ingress card, the egress card and the one or more service component cards are blades connected to the backplane.

3. The packet node of claim 1, wherein:
the first VMAC address and the second VMAC address are part of a service path that the packet follows throughout the packet node.

4. The packet node of claim 1, further comprising:
a controller for receiving a registration from a given service component, upon startup of a service on the given service component.

5. The packet node of claim 1, wherein:
the registrations are for each of a plurality of services provided by the packet node;
the controller further assigns a corresponding VMAC address to each of the plurality of services, wherein a plurality of VMAC addresses are mapped on the plurality of service components; and
the controller further stores mappings between the plurality of VMAC addresses and the plurality of service components in a table of the layer two switch.

6. The packet node of claim 5, further comprising:
a plurality of layer two switches;
wherein the controller further receives registrations from each of the plurality of layer two switches; and
wherein the controller further ores the mappings on each of the plurality of layer two switches.

7. The packet node of claim 1, wherein:
the controller further receives, upon failure of one of the plurality of service components, an updated registration from an alternate service component taking over from the failed service component, updates a mapping for a service supported by the alternate service component, and stores the updated mapping on a table of the layer two switch.

8. The packet node of claim 1, wherein:
the packet node is one of a router, a server or a gateway.

9. The packet node of claim 1, wherein:
the packet node is an Internet Protocol (IP) node.

10. The packet node of claim 1, wherein:
the packet node is a Multiprotocol Label Switching (MPLS) node.

11. The packet node of claim 1, wherein:
the packet node is an Ethernet node.

12. The packet node of claim 1, wherein:
the ingress card further adds a Virtual Location Area Network (VLAN) identification to the packet prior to forwarding the packet to the layer two switch; and
the layer two switch further uses the VLAN identification as a basis for forwarding the packet to the first service component.

13. A method of switching a packet in a packet node, the method comprising the steps of:
receiving the packet on an input port of an ingress card, classifying the packet according to a service provided by the packet node, adding to the packet a first Virtual Media Access Control (VMAC) address selected according to the service and forwarding the packet to a layer two switch of the packet node;
receiving registrations, at a controller, from a plurality of service components, upon startup of the packet node;
forwarding the packet from the layer two switch to a first service component of the packet node, the first service component being selected by the layer two switch based on the first VMAC address;
processing the packet, at the first service component, replacing the first VMAC address of the packet with a second VMAC address and forwarding the packet to the layer two switch;
forwarding the packet from the layer two switch to a second service component of the packet node, the second service component being selected by the layer two switch based on the second VMAC address;
processing the packet, at a second service component, replacing the second VMAC address of the packet with a third VMAC address and forwarding the packet to an egress card of the packet node, based on the third VMAC address; and
removing the third VMAC address, at the egress card, and forwarding the packet on an output port of the egress card;
wherein the first and second service components each support a part of the service provided by the packet node;
wherein the controller further provides the ingress card and each of the plurality of service components with a list of VMAC addresses;
wherein the ingress card selects the first VMAC address from the list of VMAC addresses after classifying the packet; and
wherein each of the plurality of service components uses the list of VMAC addresses to replace an incoming VMAC address before forwarding the packet.

* * * * *

UNITED STATES PATENT AND TRADEMARK OFFICE
CERTIFICATE OF CORRECTION

PATENT NO. : 8,526,435 B2  
APPLICATION NO. : 12/727385  
DATED : September 3, 2013  
INVENTOR(S) : Dyke et al.

Page 1 of 1

It is certified that error appears in the above-identified patent and that said Letters Patent is hereby corrected as shown below:

On the Title Page, Item (52), under "U.S. Cl.", in Column 1, Line 2, delete "370/398;" and insert -- 370/397; --,therefor.

In the Specification

In Column 7, Line 48, delete "ports 2220" and insert -- ports 222 --, therefor.

In the Claims

In Column 9, Line 40, in Claim 6, delete "ores" and insert -- stores --, therefor.

Signed and Sealed this  
Thirty-first Day of December, 2013

Margaret A. Focarino  
*Commissioner for Patents of the United States Patent and Trademark Office*